E. C. AHLHEIM.
ROLLING PIN.
APPLICATION FILED OCT. 7, 1914.

1,158,111.

Patented Oct. 26, 1915.

WITNESSES:
Samuel S. Matthews
Pearl M. Yuncher

INVENTOR
Edward C. Ahlheim
BY
John V. Bow
his Attorney

UNITED STATES PATENT OFFICE.

EDWARD C. AHLHEIM, OF MANSFIELD, OHIO.

ROLLING-PIN.

1,158,111.  Specification of Letters Patent.  Patented Oct. 26, 1915.

Application filed October 7, 1914.  Serial No. 865,422.

*To all whom it may concern:*

Be it known that I, EDWARD C. AHLHEIM, a citizen of the United States of America, residing at Mansfield, in the county of Richland and State of Ohio, have invented certain new and useful Improvements in Rolling-Pins, of which the following is a specification.

This invention relates to certain new and useful improvements in rolling pins, and the primary object of the invention is to provide a rolling pin the body of which is formed of aluminum possessing the advantages of being light in weight, sanitary and practically unbreakable.

Further the invention resides in the particular manner of constructing the parts so as to present a rolling pin which is simple and economical in manufacture, and in which the handle portions or members are secured to the body in an improved manner.

Figure 1:
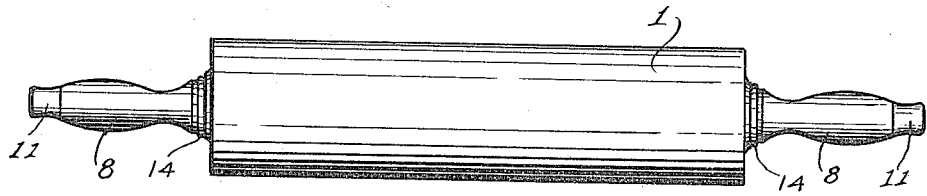
Figure 2:
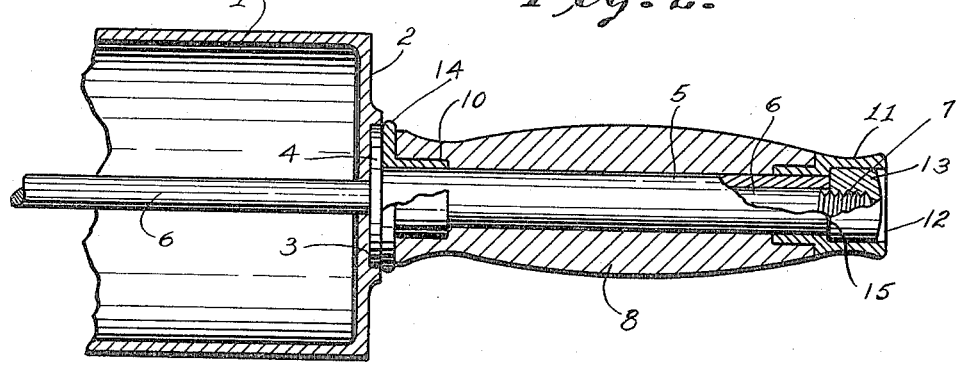
Figure 3:
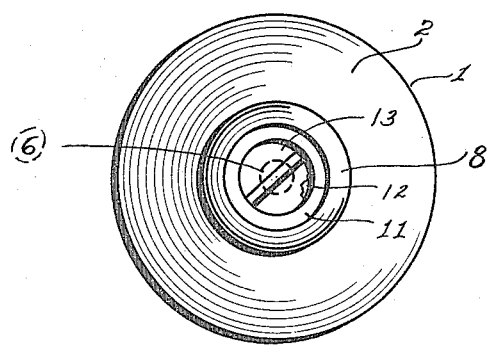

In the drawings:—Figure 1 is a side elevation of the device; Fig. 2, is an enlarged fragmentary sectional view; and Fig. 3, is an end elevation.

In proceeding in accordance with the present invention, I employ a cylindrical roller 1 which is made of aluminum and has its ends closed as indicated at 2. Each of the ends is countersunk at 3 to receive therein the flanged ends 4 of sleeves 5. The sleeves, of which there is one at each end of the roller 1, are mounted upon the ends of a bolt 6, the extremities of the bolt being threaded at 7. The two handles 8 are mounted on the respective sleeves 5, and freely rotate thereon.

A flanged bushing 10 is secured to the inner end of each handle being received in a countersunk portion provided therefor in the inner end of the handle, the flange 14 of which bushing extends over the inner end of the handle as depicted in Fig. 2 so as to protect the end of the handle and to also provide a metal wearing face which abuts the flange 4 and serves to protect the latter. The bushing rotates with the handle 8 and on the sleeve 5 and serves to materially strengthen the inner end of the handle and to reinforce same.

A bushing 11 is secured to the outer end of each handle and has a cavity 12 in its outer end to receive a nut 13 which engages over the threads 7 of the bolt 6. The nut abuts against the outer end of the sleeve 5 and thus serves to retain the sleeve and the handle carried thereby on the bolt 6. The sleeves 5 are made of such length as permits the nuts 13 to be tightened without placing any pressure upon the handles. The bushing 11 acts to protect the outer end of the handle and to strengthen same, and also serve as a housing for the nut 13. The nut 13 engages the shoulder 15 formed by the bottom of the countersunk portion or cavity 12 of the bushing 11, and thus presents a metal wear face. The two bushings act to take the strain to which the handle may be subjected and also provide a bearing for each end of the handle so as to allow the latter to freely rotate on the sleeve 5.

Aluminum is not only sanitary, but moreover will not corrode or disintegrate, and will not break as will glass rollers such as are frequently used. In addition aluminum is easy to clean and to keep clean and by reason of its natural high polish is very effective for the purpose of rolling dough. Further, aluminum possesses an attractive appearance and one which is suggestive of the highest order of cleanliness, thus increasing the salability of the rolling pin.

What is claimed is:—

1. In a rolling pin, a body, a bolt passed through the body and having its ends projecting beyond the ends of the body, the ends of the body having countersunk portions, a flanged sleeve on each end of the bolt having the flange thereof received in said countersunk portion, a flanged bushing on the inner end of the sleeve the flange of which abuts the flange of the sleeve, a handle surrounding the sleeve and having a counterbored part to receive the bushing, the inner end of the handle abutting the flange of the bushing, the outer end of the handle having a counterbored portion, a bushing received in the last named counterbored portion and having a nut cavity which forms a shoulder, and a nut on the bolt abutting the shoulder and the outer end of the sleeve.

2. In a rolling pin, a body having counterbored ends, a bolt passed through the body, a sleeve on the bolt having a flange which engages in said counterbored portion, a handle on the sleeve, a bushing on the inner end of the handle having a flange which abuts the flange of the sleeve and covers same, a bushing on the outer end of the handle having a nut cavity forming a shoulder, and a nut on the bolt engaging the outer end of the sleeve and the shoulder.

3. In a rolling pin, a body having closed ends, a bolt passed through the body, a flanged sleeve on each end of the bolt abutting the body at the inner ends of the sleeves, handles carried by said sleeves a bushing on each end of the sleeve connected to the respective ends of the handle, one of the bushings abutting the flange of the sleeve, said bushings being freely rotatable on the sleeve, and a nut on the bolt abutting the outer end of the sleeve and the outer end of the outer bushing.

4. A tubular rolling pin made of aluminum metal having closed ends, a throughgoing bolt fitted to suitable apertures formed in the closed ends, flanged sleeves provided with bushings loosely fitted to the projecting ends of the bolt, handles secured to the sleeves and bushings, and means to securely fasten the bolt to the rolling pin and to prevent lateral movement of the handles without affecting the rotation of the ends of the bolt within the inner periphery of the handles.

In testimony whereof I affix my signature in presence of two witnesses.

EDWARD C. AHLHEIM.

Witnesses:
JOHN H. COSS,
PEARL M. YUNCHER.

Copies of this patent may be obtained for five cents each, by addressing the "Commissioner of Patents, Washington, D. C."